No. 793,989. Patented July 4, 1905.

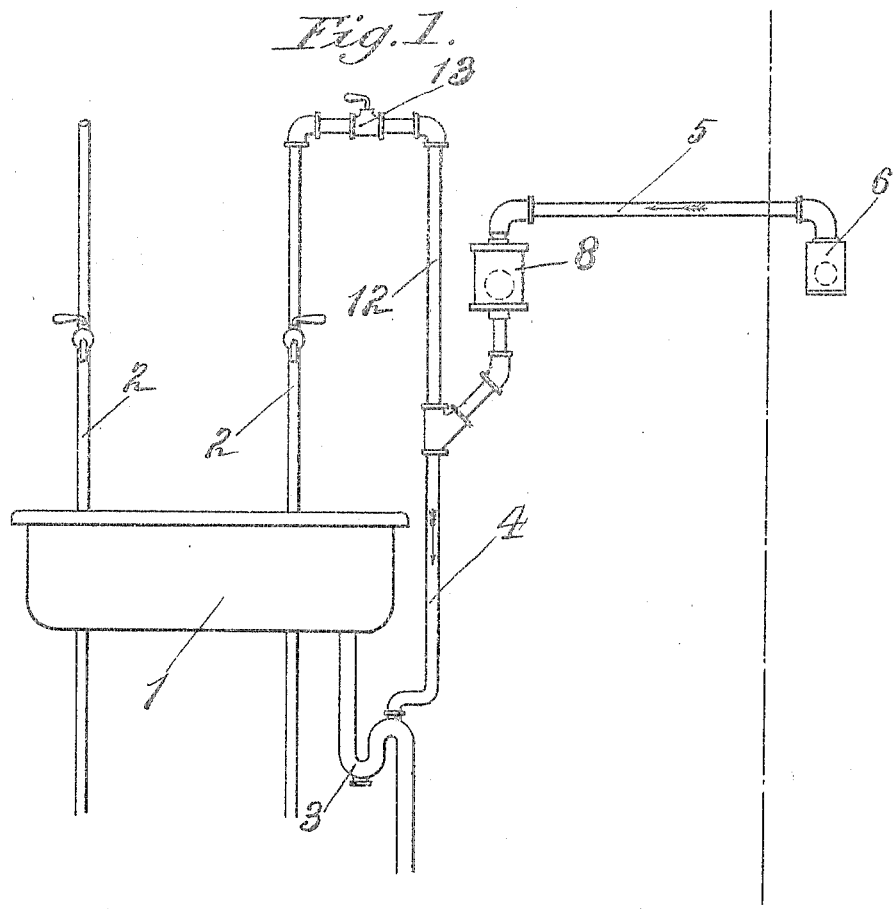

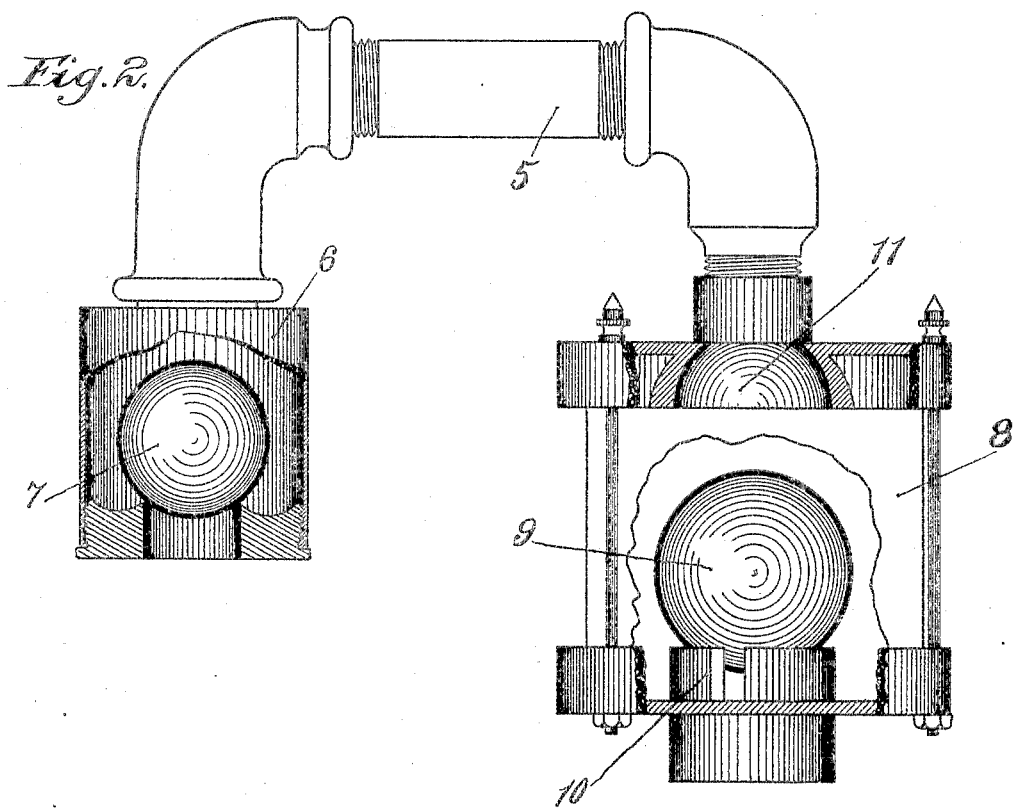

UNITED STATES PATENT OFFICE.

THOMAS H. CLARK, OF SCRANTON, PENNSYLVANIA.

FLUSHING-VENT.

SPECIFICATION forming part of Letters Patent No. 793,989, dated July 4, 1905.

Application filed January 16, 1905. Serial No. 241,290.

*To all whom it may concern:*

Be it known that I, THOMAS H. CLARK, a citizen of the United States, residing at Scranton, in the county of Lackawanna and State of Pennsylvania, have invented certain new and useful Improvements in Flushing-Vents, of which the following is a specification.

This invention relates to ventilation systems for liquid-seal traps; and it has for its object to provide an improved means for cleaning the vent-pipe, and thereby preventing a complete siphoning of the seal, which siphoning takes place as soon as the vent-pipe has become clogged.

A further object is to dispense with a great deal of the piping now employed for venting sewage systems.

Other and still further objects will appear in the following description and will be more particularly pointed out in the claims.

In the drawings, Figure 1 is a diagrammatic view of my system as applied to an ordinary gooseneck seal-trap attached to a kitchen-sink. Fig. 2 is a view, partly in section, showing the air-inlet valve and the valve for preventing the flushing water escaping through the air-inlet valve.

1 indicates a sink, 2 the water-pipes, and 3 the ordinary gooseneck liquid-seal trap connected to the discharge of the sink 1. Leading from the discharge end of the liquid-seal trap is a pipe 4, which is connected to the outside atmosphere by a branch 5, led from the pipe 4 through the nearest wall in the house to dispense with unnecessary piping. At the end of the branch pipe 5 is a depending valve-casing 6, which carries a ball-valve 7 to prevent the escape of sewer-gas through the pipes 4 and 5, but which admits air into the discharge of the seal to ventilate the same. Mounted in the branch pipe 5 is a valve-casing 8, carrying a float ball-valve 9, which normally rests on a seat 10 and permits the air to pass around it to the seal-trap 3, but which when water enters the casing 8 by a means hereinafter described rises against the seat 11 and prevents the outflow of the water through the air-vent valve at the end of the pipe 5. A branch pipe 12 also leads from the pipe 4 and is connected to a water-pipe 2. Within this pipe is positioned a valve 13, by which water from the water-pipe 2 may be conducted to the discharge end of the liquid-seal trap 3.

In the ordinary use of the system water is discharged from the sink 1 through the liquid-seal trap 3 and air is let into, but prevented from passing from, the trap by means of pipe 4, branch 5, and air-inlet valve 7. After a time grease and other material will collect in the pipe 4, forming portion of the air-vent, and the trap 3 will then siphon and cause the sewer-gases to be distributed in the house. When it is found that the vent-pipe is becoming clogged, the valve 13 is opened, thus causing water to be conducted into the vent-pipe and forcing the clogging material into the discharge-pipe. The float-valve 9 will close the vent-pipe and prevent the flow of the water through the inlet air-valve 7.

Various changes in form, proportion, and minor details in construction of my invention within the scope of the appended claims may be made, and I therefore do not wish to be limited to the embodiment herein shown and described.

Having thus described my invention, what I claim is—

1. In a ventilation system for liquid-seal traps, the combination with the liquid-seal trap, of a vent-pipe leading to the discharge end thereof, an air-inlet valve for the vent-pipe, and a flushing-pipe connected to the vent-pipe.

2. In a ventilation system for liquid-seal traps, the combination with the liquid-seal trap, of a vent-pipe leading from the discharge end thereof, an air-inlet valve for the vent-pipe, a flushing-pipe connected to the vent-pipe, and a valve in the vent-pipe preventing a flow from the flushing-pipe through the air-inlet pipe.

3. In a ventilation system for liquid-seal traps, the combination with the sink, of a water-pipe therefor, a liquid-seal trap connected to the discharge of the sink, a vent-pipe leading from the discharge end of the liquid-seal trap, an air-inlet valve in the vent-pipe, a flushing-pipe connected to the vent-pipe, and to the water-supply pipe, a valve in the flushing-pipe, and a valve in the vent-pipe preventing a flow from the flushing-pipe through the air-inlet valve.

4. In a ventilation system for liquid-seal traps, the combination with the liquid-seal trap and a vent-pipe therefor of a flushing-pipe connected to the vent-pipe, and a valve preventing a flowing from the flushing-pipe through one end of the vent-pipe.

The foregoing specification signed this 20th day of July, 1904.

THOMAS H. CLARK.

In presence of—
 EDWIN S. CLARKSON,
 HERVEY S. KNIGHT.